(12) United States Patent
Pusdesris et al.

(10) Patent No.: US 11,263,138 B2
(45) Date of Patent: Mar. 1, 2022

(54) CORRELATED ADDRESSES AND PREFETCHING

(71) Applicant: Arm Limited, Cambridge (GB)

(72) Inventors: Joseph Michael Pusdesris, Austin, TX (US); Miles Robert Dooley, Austin, TX (US); Michael Filippo, Driftwood, TX (US)

(73) Assignee: Arm Limited, Cambridge (GB)

( * ) Notice: Subject to any disclaimer, the term of this patent is extended or adjusted under 35 U.S.C. 154(b) by 9 days.

(21) Appl. No.: 16/176,686

(22) Filed: Oct. 31, 2018

(65) Prior Publication Data
US 2020/0133863 A1      Apr. 30, 2020

(51) Int. Cl.
*G06F 12/0862*      (2016.01)

(52) U.S. Cl.
CPC .. *G06F 12/0862* (2013.01); *G06F 2212/1024* (2013.01); *G06F 2212/602* (2013.01)

(58) Field of Classification Search
CPC ........... G06F 12/0862; G06F 2212/602; G06F 2212/1024
See application file for complete search history.

(56) References Cited

U.S. PATENT DOCUMENTS

| | | | | |
|---|---|---|---|---|
| 6,311,260 | B1* | 10/2001 | Stone | G06F 9/383 711/137 |
| 6,535,972 | B1* | 3/2003 | Mahurin | G06F 9/30094 712/217 |
| 6,539,458 | B2* | 3/2003 | Holmberg | G06F 9/3802 711/117 |
| 2003/0105938 | A1* | 6/2003 | Cooksey | G06F 12/0215 711/203 |
| 2007/0055824 | A1* | 3/2007 | Diefendorff | G06F 12/0862 711/137 |
| 2011/0145509 | A1* | 6/2011 | Speight | G06F 12/0862 711/137 |
| 2017/0116133 | A1* | 4/2017 | Kumar | G06F 12/1027 |

OTHER PUBLICATIONS

Roth, et al. "Dependence Based Prefetching for Linked Data Structures." In the proceedings of the 8th International Conference on Architectural Support for Programming Languages and Operating Systems, Oct. 1998. pp. 115-126. (Year: 1998).*

* cited by examiner

*Primary Examiner* — Kalpit Parikh
(74) *Attorney, Agent, or Firm* — Nixon & Vanderhye P.C.

(57) ABSTRACT

An apparatus is provided that includes cache circuitry that comprises a plurality of cache lines. The cache circuitry treats one or more of the cache lines as trace lines each having correlated addresses and each being tagged by a trigger address. Prefetch circuitry causes data at the correlated addresses stored in the trace lines to be prefetched.

18 Claims, 9 Drawing Sheets

CORRELATED ADDRESSES AND PREFETCHING

TECHNICAL FIELD

The present disclosure relates to data processing. More particularly, it relates to prefetching.

DESCRIPTION

Prefetching is a technique in which data is proactively fetched from main memory and stored near to a processor at a time before that data is explicitly requested by that processor. In this way when the processor requires the data, it is nearby and can be obtained quickly. Prefetching is usually triggered by a memory address being accessed, either explicitly or via another prefetch operation. However, when addresses are correlated, this can lead to complex sequences of actions that may result in higher latency being experienced in order to obtain the desired data from memory.

SUMMARY

Viewed from a first example configuration, there is provided an apparatus comprising: cache circuitry comprising a plurality of cache lines, wherein the cache circuitry is adapted to treat one or more of the cache lines as trace lines each comprising correlated addresses and each being tagged by a trigger address; and prefetch circuitry to cause data at the correlated addresses stored in the trace lines to be prefetched.

Viewed from a second example configuration, there is provided a method comprising: storing a plurality of cache lines including one or more trace lines each comprising correlated addresses and each being tagged by a trigger address; and causing data at the correlated addresses stored in the trace lines to be prefetched.

Viewed from a third example configuration, there is provided an apparatus comprising: means for storing a plurality of cache lines including one or more trace lines each comprising correlated addresses and each being tagged by a trigger address; and means for causing data at the correlated addresses stored in the trace lines to be prefetched.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with some aspects, there is provided an apparatus comprising: cache circuitry comprising a plurality of cache lines, wherein the cache circuitry is adapted to treat one or more of the cache lines as trace lines each comprising correlated addresses and each being tagged by a trigger address; and prefetch circuitry to cause data at the correlated addresses stored in the trace lines to be prefetched.

In such aspects, a collection of addresses are correlated with each other. The correlation could, for instance, be temporal so that all of the addresses are accessed within a same period or so that all of the addresses are accessed as a consequence of one of the addresses being accessed. Other forms of temporal correlation (or correlation in general) are also possible. The correlated addresses are stored in one of the cache lines, referred to as a trace line, which makes up the cache lines in the cache circuitry. Furthermore, the trace line is tagged by a trigger address. The addresses could be addresses for storage circuitry other than the cache circuitry and could be for use in a memory hierarchy. For instance, the addresses could be addresses of data that is backed up by a DRAM. Prefetch circuitry causes the data stored at the correlated addresses that are provided in a trace line to be prefetched from, e.g. from the underlying DRAM. In this way, all of the correlated addresses can be fetched at the same time, thereby potentially reducing latency.

In some embodiments, the prefetch circuitry is adapted to cause the data at the correlated addresses to be prefetched in response to the trigger address being accessed. By prefetching the data when the trigger address is accessed, the data at the correlated addresses can be accessed in advance of it being needed. The trigger address can therefore be set to a first address that subsequently causes the correlated addresses to be accessed. These need not all be accessed as a direct result of the trigger address being accessed. For instance, the trigger address could access data that thereby causes another of the correlated addresses to be accessed.

In some embodiments, the apparatus comprises obtaining circuitry to obtain the correlated addresses, wherein the correlated addresses relate to data where a miss has occurred. A miss occurs in a cache when data is requested that is not present in the cache. Typically, this will happen as a consequence of the data not having been (pre)fetched. The present apparatus therefore considers correlated data addresses that have not otherwise been prefetched by any prefetching circuitry. By causing these data addresses to be prefetched in the future, the efficiency of the overall system may be improved by causing a greater proportion of data to be subject to prefetching and thereby reducing effective memory latency.

In some embodiments, the correlated addresses relate to data that has been explicitly fetched. Such data has not, therefore, been proactively fetched (e.g. prefetched).

In some embodiments, the correlated addresses relate to data that has been fetched as part of a load operation. In such embodiments, the correlated addresses do not relate to data that has been fetched as part of a store operation or data that is to be stored at one of the correlated addresses.

In some embodiments, the correlated addresses contain at least one storage location where another of the correlated addresses is stored. Such a dependence between the correlated addresses means that only after one of the correlated addresses is retrieved can another correlated address be retrieved. This in turn means that, if both addresses have missed in the cache, there is an increased latency as a consequence of missed data having to be retrieved in order to be accessed, in order for another item of data to be retrieved etc.

In some embodiments, the trigger address and the correlated addresses form a linked list. A linked list is a data structure in which elements of the list each contain a pointer to another element of the list. Accessing a linked list can result in a chain of memory accesses occurring in which each element is retrieved once previous elements in the list have been retrieved. The memory access time increases linearly with the length of the linked list, assuming that all the correlated addresses have missed and must therefore be sequentially accessed via the main memory. Hence, for long linked lists, there may be a long delay before some of the underlying data can be accessed. Such a situation could arise, for instance, in a programming language such as C, where one may refer to a pointer to an item of data, where the data itself could be another pointer. Consequently, one could refer to a pointer of a pointer of a pointer (etc.) of an item of data, which may take time to fully dereference. In addition, the presence of virtual memory can cause additional problems. In particular, since there may be little or no spatial correspondence between virtual addresses and physical addresses, there is no certainty that any pointer in the chain will have been prefetched by virtue of being spatially proximal to another accessed address.

In some embodiments, each line in the plurality of cache lines include a c flag and a d flag to indicate whether that line is one of the trace lines; the c flag and the d flag are mutually-exclusive. The 'c' flag indicates whether correlated addresses are present while the 'd' flag indicates whether data other than correlated addresses is present. The two flags are mutually exclusive so that a cache line cannot contain both correlated addresses and data other than correlated addresses. However, it is possible for a line to contain neither correlated addresses nor data other than correlated addresses—in which case the cache line is considered to be empty or invalid.

In some embodiments, the correlated addresses in each of the trace lines are compressed. This makes it possible for more addresses to be stored in a single cache line than if compression was not used.

There are a number of ways in which compression can be achieved. However, in some embodiments, the correlated addresses in a given trace line are compressed by storing a base address and, for each individual address in the correlated addresses of the given trace line, a delta between the base address and the individual address. Each cache line therefore contains a base address and a number of different deltas.

In some embodiments, the base address comprises common bits between the plurality of correlated addresses in the given trace line; and the delta comprises remaining bits from the individual address when the common bits are removed. The addresses can be decompressed by concatenating the delta with the common bits. As an alternative, the delta could be an offset from the base address (e.g. achieved via subtraction), with leading zeros (or ones) removed. However, such embodiments could provide a variable number of deltas in a single cache line. In some embodiments, an offset could be calculated using a binary operator such as a XOR and again by removing leading zeros (or ones). Other options will be known to the skilled person.

In some embodiments, the apparatus comprises eviction circuitry to evict the plurality of cache lines from the cache circuitry in dependence on one or more standard eviction conditions, wherein the eviction circuitry is inhibited from evicting the trace lines in dependence on one or more correlated-address eviction conditions. In these embodiments, cache lines that do not contain correlated addresses are subjected to standard eviction conditions. These could, for instance, be based on a Least Recently Used (LRU) principle. In contrast, the trace lines are subject to further (or, in some embodiments, different) eviction conditions because they are more likely to contain more data than a cache line that contains other data and so should be removed with more caution.

In some embodiments, the one or more correlated-address eviction conditions includes a fill condition; the plurality of cache lines are grouped into a plurality of sets; each set in the plurality of sets has a set counter, which is incremented in response to a fill being made to that set; and the fill condition causes a given trace line in the set to be made evictable based on the set counter associated with the given trace line. In such embodiments, a particular trace line is kept at least until a certain number of fills are made to the set containing that trace line. Typically, cache eviction takes place in response to a fill, since the act of adding new data to the cache causes other cache lines to have to be evicted. Hence, by keeping the trace line based on the number of fills that have taken place, it is possible to keep the trace line for longer than another cache line would be kept. Note that the counter need not be incremented in response to every fill that takes place. In some embodiments, the counter can be incremented for every number of fills that takes place, for fills having particular criteria (e.g. the address having particular bits), or with random probability. By not incrementing the counter in response to every fill that takes place, it is possible to implement a smaller counter.

In some embodiments, the given trace line in the set is associated with a line counter; the line counter is incremented each time the set counter of the given line reaches a predetermined value; and the fill condition causes the given line to be made evictable when the line counter reaches a further predetermined value. In order for a trace line to made evictable, therefore, the set counter associated with that trace line must reach its predetermined value a number of times. This helps to avoid a situation in which the counter is already near the predetermined value when a new trace line is added, thereby causing the trace line to be made evictable very quickly or even immediately.

In some embodiments, the apparatus comprises trigger queue circuitry to store a plurality of triggering addresses, wherein in response to the trigger address of the given line missing when the trigger queue circuitry is at its maximum capacity, the line counter associated with the given line is incremented. In these embodiments, when a trigger address (e.g. an address that misses in the cache that also causes other misses to occur) is encountered, an attempt is made to add that trigger to the queue. Other misses that occur in the near future are attributed to the latest entry in the queue. The queue has a maximum capacity. Hence, if a trigger address is detected when the queue is full, that trigger address cannot be added. Furthermore, if that trigger address is the tag of a trace line in the cache, then that trace line is demoted (e.g. brought closer to being evicted). This scenario recognises the fact that it is not always possible to store all correlated addresses. Thus, the addresses that are found later in the process (e.g. later in a chain or linked list) are deprioritised. This is because the probability with which an address will be accessed in a chain/linked lists decreases as one iterates through the chain/linked list. For example, in a linked list where the only start point is the first entry of the linked list, the first entry must always be accessed. The second entry must be accessed where access is desired to any entry other than the first entry. The third entry must be accessed where access is desired to any entry other than the first entry or second entry, and so on. The final entry is only accessed where access is desired to the final entry itself. There is therefore expected to be less value in adding entries further down the chain. To avoid keeping such entries, these entries are brought closer to eviction if they have already been added and if there are other entries to be added (as is the case where the queue is full).

In some embodiments, the one or more correlated-address eviction conditions includes a double-hit condition; the double-hit condition causes a given trace line to be made evictable in response to the cache circuitry hitting, in response to a request, on both the given cache line and a further cache line that is other than one of the trace lines; and the given cache line and the further cache line have a same tag. If the trigger address is a tag for a data line in the cache then it cannot also be the tag for a trace line in the cache. In some of these embodiments, in response to adding a new trace line when the cache contains the further cache line that is other than one of the trace lines, the further cache line is marked as being evictable. Hence, in these embodiments, when correlated addresses are added, any existing line containing data is made evictable. If, later, a line containing correlated addresses and data is discovered that have the same tag, it is assumed that the triggering address now points to data and thus the trace line is made evictable. In other embodiments, this could be reversed so that existing correlated data lines are made evictable when a data line is to be added and the sudden appearance of a correlated data line (e.g. a trace line) having the same tag means that the data line is to be made evictable.

In some embodiments, the cache circuitry is adapted to limit a number of the trace lines to a predetermined level. The number could be an absolute value, an absolute percentage, a ratio, or another way of defining a limit. Furthermore, the limit could apply to the entire cache or a portion of the cache such as a set. For instance, in some embodiments, the cache circuitry is adapted to limit the number of the trace lines on a per-set basis so that only 75% of the lines in each set are permitted to be trace lines.

Particular embodiments will now be described with reference to the figures.

Figure 1A:
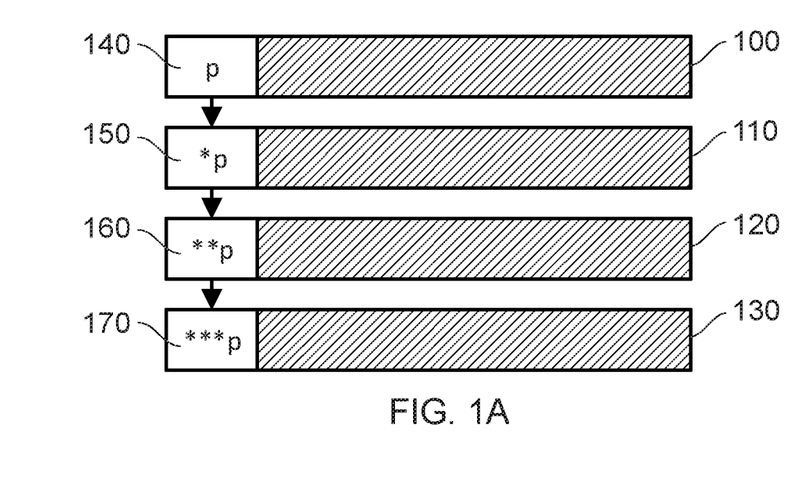
FIG. 1A illustrates an example arrangement of data in a cache.

FIG. 1A shows an example of a number of cache lines 100, 110, 120, 130. Each of these cache lines contains a single value 140, 150, 160, 170. The values 140, 150, 160, 170 are arranged in a "linked-list" such that the first value 140 is of a memory address at which a second value 150 is stored. The second value 150 is of a memory address at which a third value 160 is stored. The third value 160 is of a memory address at which a fourth value 170 is stored. In this example, the fourth value is a data value rather than a reference to another memory location. Such a scenario could occur in a programming language such as C, where the type of "pointer" is permitted, which is a data value that refers to a location in memory where another data value (potentially another pointer) is stored. As shown in this example, each of the data values 140, 150, 160, 170 occupies its own cache line 100, 110, 120, 130. This might arise as a consequence of virtual memory. In particular, even if virtual memory locations are located within close special proximity, there is no guarantee that the physical address to which those virtual addresses relate are in spatial proximity to each other. Consequently, even though the virtual addresses may be close together, each of the physical addresses could be located in distinct cache lines.

Figure 1B:
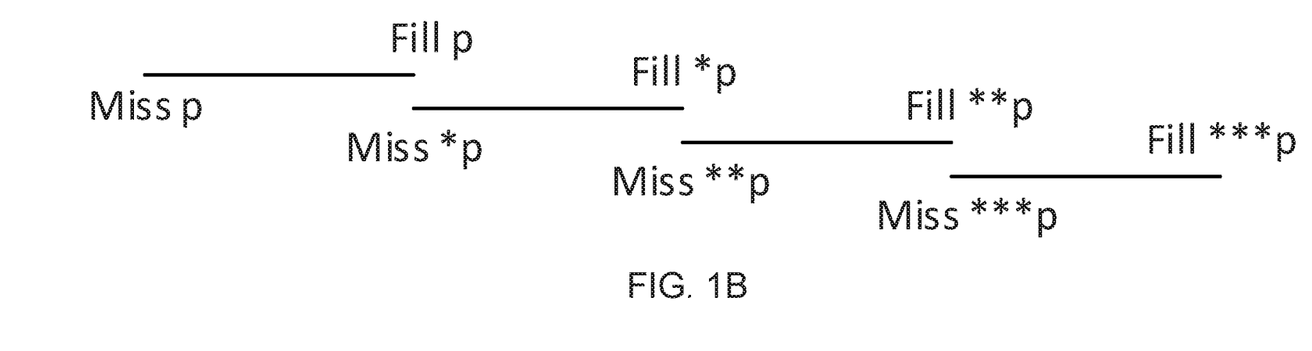
FIG. 1B shows example timelines for fetching the data from memory when the data is configured as shown in FIG. 1A.

FIG. 1B is a timeline that shows the time taken for each of the data values 140, 150, 160, 170 to be handled in a situation where each of those values is initially stored in a main memory. This situation could arise, for instance, where prefetching for these values has failed. Initially, the first value 140 ($p$) is fetched from memory. Once this is retrieved, a cache fill operation occurs. The value p is then analysed and it is determined that the value p is a pointer to a second data value 150. Since the second data value 150 has not been prefetched, this must again be fetched from memory. This again takes a period of time, and a second fill operation on the retrieved data value (*p) takes place. This is again analysed and determined to be another pointer. Accordingly, another retrieval from memory must take place, after which a third fill operation on the data fill (p) must occur. Finally, this data value is analysed and determined to be another pointer. The address that is pointed to must therefore be retrieved from memory and the fourth fill operation on the data value (*p) must take place. As a consequence of this sequence of actions, long memory latency occurs. In particular, in order to access the underlying data value via its sequence of pointers, it is necessary to perform a number of dereferencing operations, each of which requires an access to the main memory. If none of the data values is stored in the memory hierarchy, this requires a number of access operations which is therefore time-consuming. It will be appreciated since none of the data values 140, 150, 160, 170 may be spatially proximal, and since the first value 140 has not been prefetched, there may be no mechanism by which any of the other values may have been prefetched. Hence, in certain situations such as linked lists, there could be a long period of time required in order to traverse the list.

Figure 2:
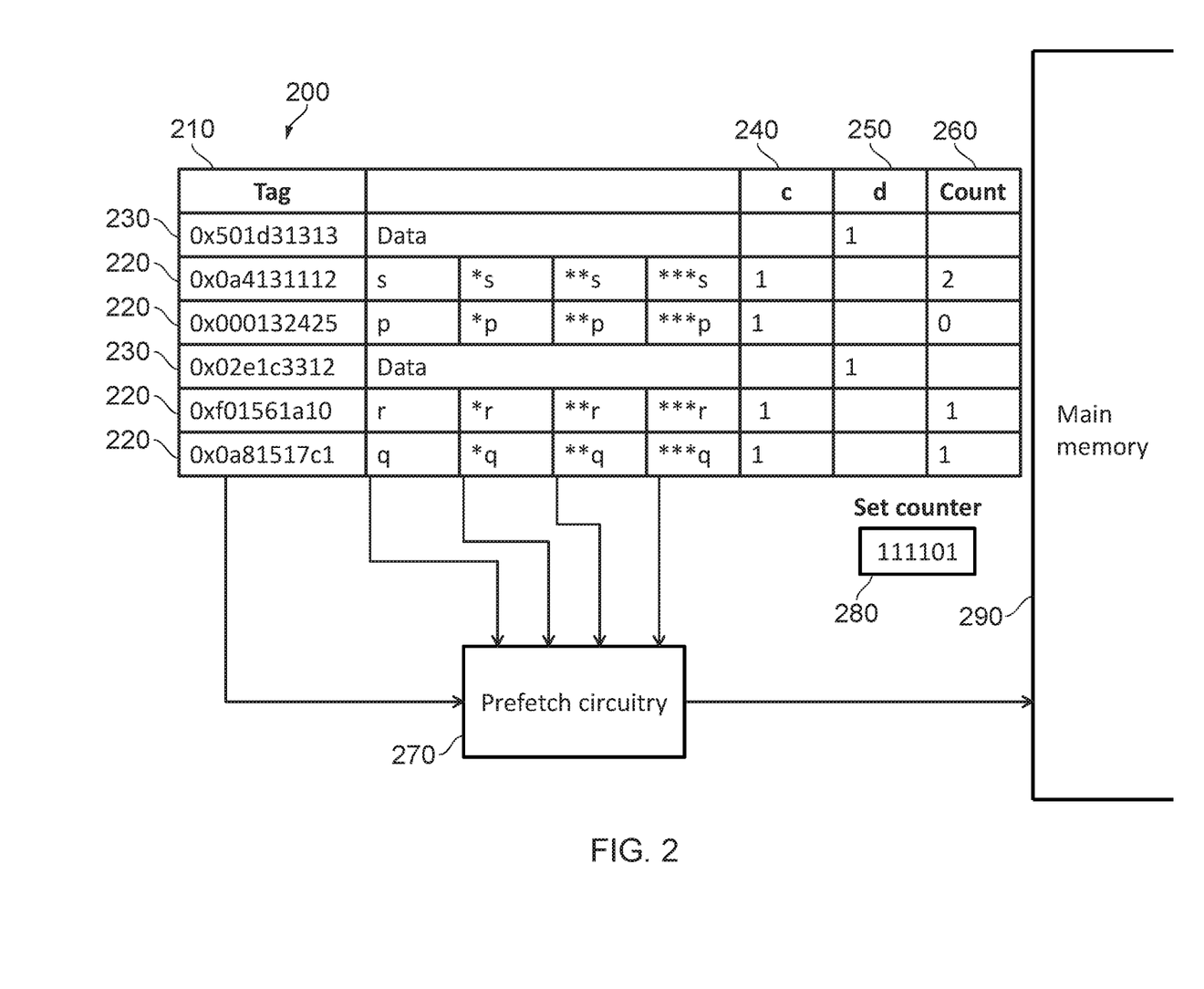
FIG. 2 schematically illustrates an apparatus in accordance with some examples.

FIG. 2 illustrates an apparatus 200 in accordance with some embodiments. The apparatus 200 includes cache circuitry 210. In this example, one set of the cache circuitry 210 is illustrated, which includes a number of cache lines 220, 230. Some of these cache lines include typical data cache lines 230. These are tagged with an address that corresponds with the underlying physical address at which the data is stored in the backing storage such as main memory 290. The cache 210 also includes a number of "trace lines" 220. These lines are also tagged. However, in these situations, the tag acts as a trigger. When the address corresponding with the trigger is accessed, the data values that are stored in that cache line 220 are sent to prefetching circuitry 270 and are fetched from the main memory 290. Consequently, after a first access to the trigger address is made, all of the data values listed on the trace line 220 can be fetched from main memory 290 and thereafter accessed from the cache 210.

In this example, each of the cache lines contains two mutually exclusive flags. A 'c' flag 240 indicates whether the cache line contains one or more correlated addresses, thereby indicating that the cache line is a trace cache line 220. The 'd' flag 250 indicates that the cache line does not contain the one or more associated addresses and instead contains regular data. Such cache lines are not trace lines 220 but are instead regular data lines 230. The two flags 240, 250 are mutually-exclusive such that both flags cannot be set simultaneously. However, it is possible for neither flag to be set thereby indicating that the cache line is invalid or contains neither data nor correlated addresses. All of the cache lines 220, 230 shown in FIG. 2 belong to a single set (of which there could be several). For each set, a set counter 280 is provided that increments each time a line fill operation occurs. This is used in combination with a line counter 260 that is provided for each trace line 220 to form an eviction scheme for the trace lines 220. This is discussed with more reference to FIGS. 6 and 7.

Figure 3:
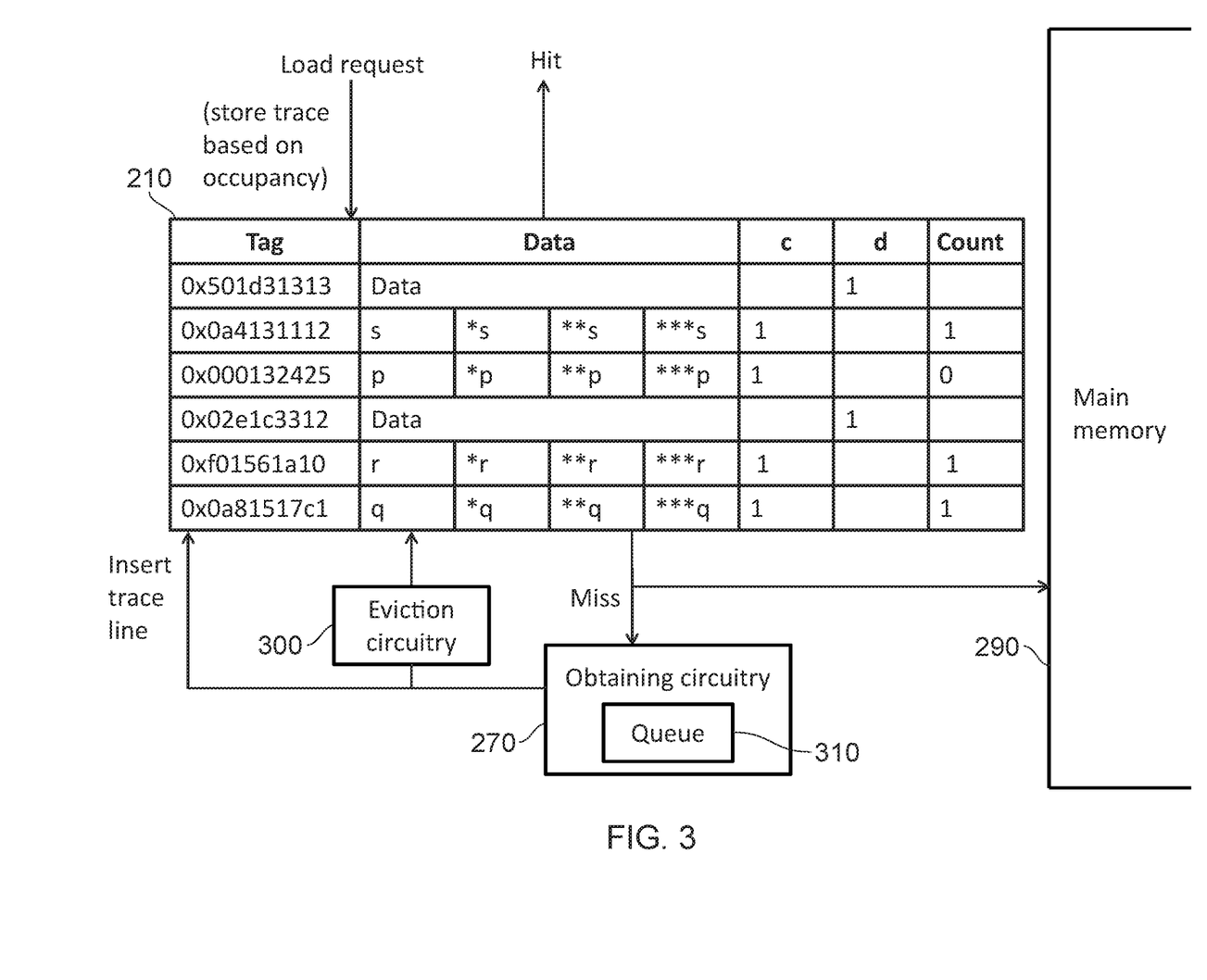
FIG. 3 schematically illustrates behavior of the obtaining circuitry in accordance with some embodiments.

FIG. 3 shows an example of how addresses can be loaded into the cache circuitry 210. When a load request is made by a processor, the address that is to be accessed is checked against the tags in the cache circuitry 210 to determine whether the data stored at that address can be returned or whether it must be accessed from main memory 290. If a 'hit' occurs indicating that the data value is present in the cache 210, then the data value is returned. Alternatively, if a miss occurs, then the data value is accessed from main memory 290. The data value may then be loaded ("filled") into one or more caches such as the previously described cache 210. Note that the cache circuitry 210 limits the occupancy of a set so that only 75% of cache lines in a given set can be trace lines 220.

In addition, in the present example, obtaining circuitry 270 obtains the address of the data value for which a miss occurred. Such a data value is a data value that was not able to be prefetched by any of the available prefetching circuitry in the apparatus. Accordingly, there is value to be had in causing this data value to be prefetched in the future. By the means of a queue 310, the obtaining circuitry 270 attempts to determine the triggering memory address that caused the missed memory address to be accessed, together with any other memory addresses that missed and were accessed at a similar time. These are gathered and then filled into the cache 210 as a trace line 220. The behaviour of the obtaining circuitry 270 in combination with the queue is shown in more detail with respect to FIGS. 4A and 4B.

Eviction circuitry 300 is provided to perform maintenance on the cache, including tracking evictability of cache lines. In particular, the eviction circuitry 300 causes an existing data line 230 that is tagged with an address to be evicted if a trace line 220 is added that uses the same tag. Other behaviour of the eviction circuitry with regards to updating the eviction status of the trace lines 220 is illustrated with respect to FIG. 6.

Figure 4A:
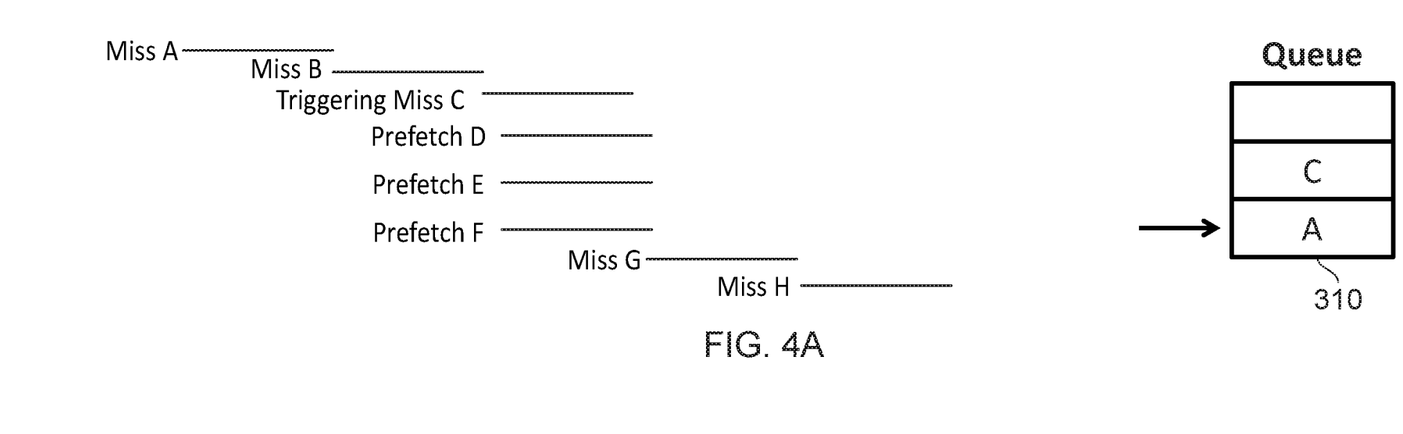
FIGS. 4A and 4B present an example of converting missed memory accesses into trace lines in accordance with some examples.

FIG. 4A shows an example timeline in which a number of different memory accesses are made. In this example, it is assumed that an address 'A' contains a data value that is a reference to a location 'B'. Location 'B' contains a data value that refers to a location 'C'. Memory address 'C' is already known (e.g. from a previous iteration of the obtaining circuitry 270) to be a trigger for memory locations 'D', 'E' and 'F'. Location 'F' contains a data value that refers to a location 'G'. Location 'G' contains a data value that refers to a memory location 'H'.

With the above descriptions in mind, the process proceeds as follows: the queue 310 is initially empty. Thus, when a miss occurs on data value 'A', it is added to the queue 310. Training then begins on value 'A' as shown by the arrow in FIG. 4a.

Since the value stored in location 'A' is a reference to location 'B' and since there is a miss on 'B', the data at location 'B' will be fetched. Since 'A' is currently being trained, value 'B' will be added as an associated/correlated address for the value currently being trained (A). The value at 'B' makes reference to location 'C'. In this example, however, 'C' is already known to be a trigger. 'C' is added to the queue 310 since the queue 310 is not currently full. As a consequence of 'C' being triggered, values 'D', 'E', and 'F' are prefetched. 'D' and 'E' are added to the currently trained value ('A'). The currently trained value (A') then becomes full. That is, no further addresses can be associated with 'A'. Consequently, 'A' is popped from the queue 310 and training resumes on the next trigger in the queue ('C'). 'F' is thus added to the cache line for the newly trained address ('C'). Since 'F' refers to 'G', which in turn refers to 'H', and since 'G' and 'H' both miss, these values will then be added to a trace line triggered by the currently trained value ('C').

Figure 4B:
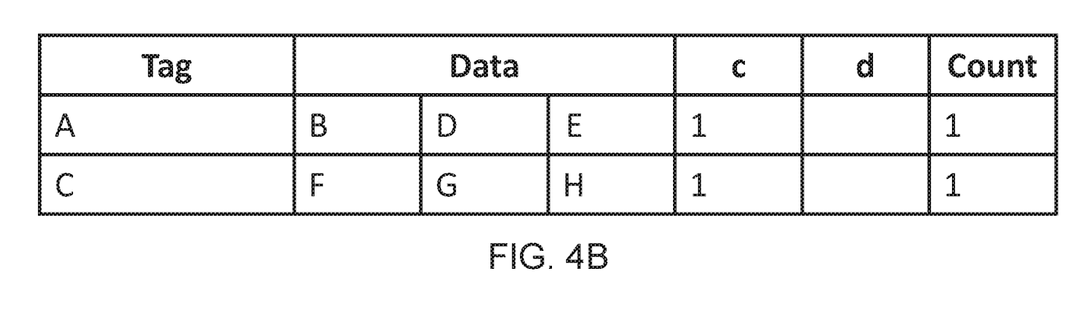

Accordingly, it will be appreciated that over time, the associated addresses and triggers may move around. In particular, in this example, there was originally assumed to be a trigger 'C' that caused 'D', 'E', and 'F' to be prefetched. However, as shown in FIG. 4B, the values are moved around so that a first trigger a causes 'B', 'D', and 'E' to be prefetched whilst a second trigger 'C' causes 'F', 'G', and 'H' to be prefetched. The old trace line that was in the cache will remain. However, the eviction policy will "demote" such a line so that it is removed from the cache more quickly. This is shown in more detail with respect to FIG. 6.

Figure 5:
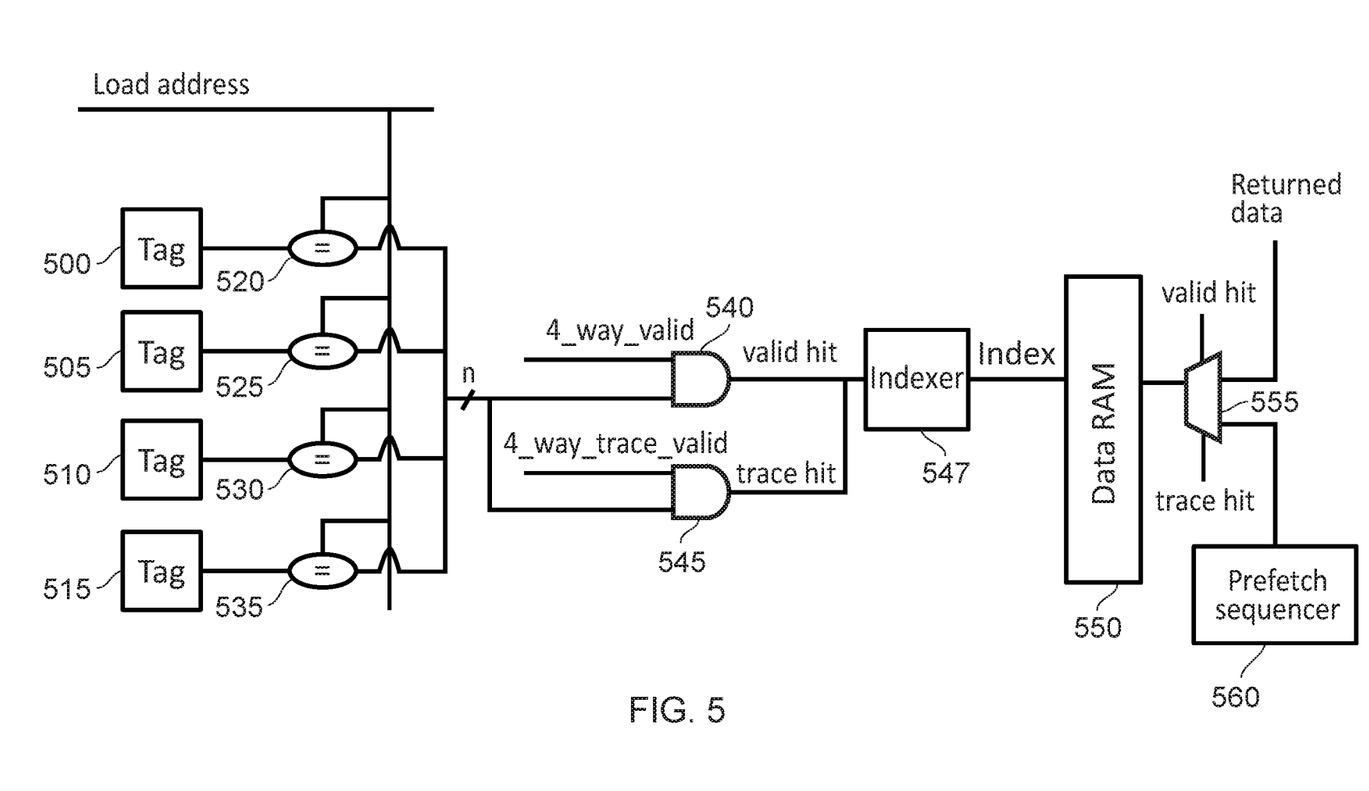
FIG. 5 schematically illustrates access circuitry for providing trace line data to the prefetcher in accordance with some embodiments.

FIG. 5 illustrates a manner in which triggering can occur in such a cache circuit 210. In particular, when an address to be loaded is received, this is compared to each of the tags, 500, 505, 510, 515 associated with the cache lines 220, 230 of the cache circuitry 210. The comparison takes place with comparison circuits 520, 525, 530, 535. The output of the comparison circuitry 520, 525, 530, 535 is, in this example, merged and provided to a pair of AND gates 540, 545. The first of these AND gates 540 provides a four-way bit field indicating which of the tags 500, 505, 510, 515 and therefore which of the corresponding cache lines is considered to be valid for data. The first AND gate 540 is therefore used to exclude those lines that do not contain valid data values, even if the tag matches the load address. The second AND gate 545 is compared to a similar bit field, which indicates which of the tags 500, 505, 510, 515 and therefore which of the corresponding cache lines contains valid trace data, e.g. a set of correlated addresses. The AND gates 540, 545 therefore collectively provide a 'hit vector' that identifies which tags 500, 505, 510, 515 and corresponding cache line are considered to be both matched and valid. In most cases, this should correspond with a single cache line. This is passed to an indexer 547 that converts the 4-bit hit vectors into a 2-bit index, which is in turn passed to a data RAM 550 that retrieves the data from the associated cache line. The output from the data RAM 550 is then passed to demultiplexer 555. If the hit was on a data line 230 of the cache 210 (e.g. if the cache line is marked as a valid data line), then the demultiplexer 555 causes the data line to be returned as data. Alternatively, if the cache line was determined to be a trace line 220 (e.g. if it is marked as a valid trace line AND an invalid data line), then the demultiplexer 555 causes this data (a series of memory addresses) to be passed to the prefetch sequencer 560, which causes the data at those addresses be fetched from the data RAM 550 and stored in a cache.

Figure 6:
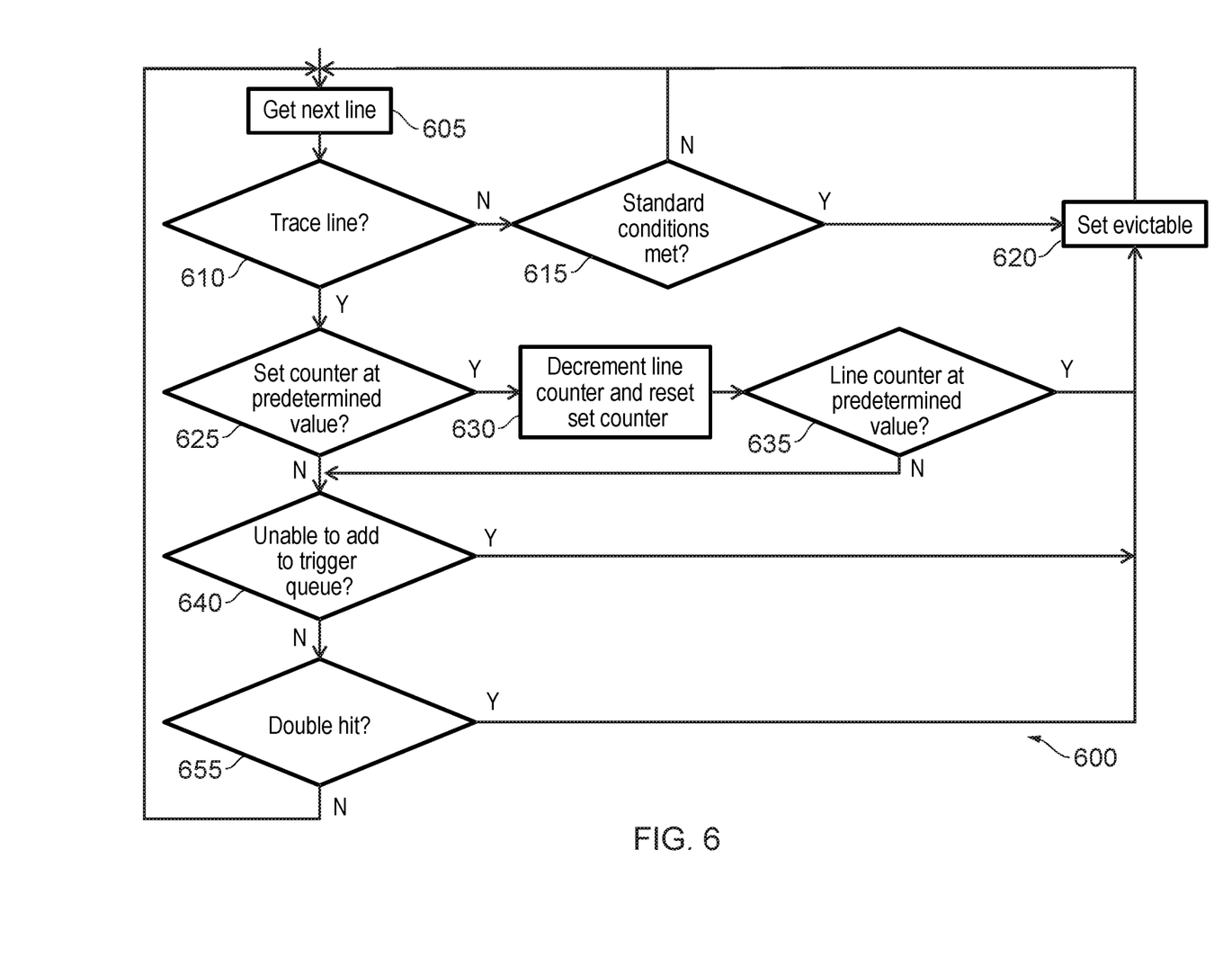
FIG. 6 shows a flowchart that illustrates a method of evicting entries from a cache in accordance with some examples.

FIG. 6 illustrates, using a flow chart 600, a method of evicting lines from the cache circuitry 220, which could be performed by eviction circuitry 300 each time an operation (e.g. a fill) is performed on the cache 210. Note that for the purposes of this example, the process is shown as being iterative for each cache line. However, in some embodiments, cache lines are instead considered in parallel.

The process begins at a step 605 where the next (or first) cache line for consideration is obtained. At a step 610, it is determined whether the line in question is a trace line 220, or a data line 230. If the line is a data line 230, then at step 615 it is determined whether the standard eviction conditions are met. Such eviction conditions will be known to the skilled person and may rely on policies such as LRU. If the conditions are met, then at step 620, the line is set as being evictable. Consequently, when an eviction must take place, this line is considered to be acceptable for replacement or removal.

If the line is not a data line (e.g. it is a trace line) then the process proceeds from step 610 to step 625 where it is determined whether the set counter 280 is at a predetermined value. For instance, the predetermined value may be 0. As previously stated, the set counter 280 is incremented each time a line fill operation occurs on the cache circuitry 210 in a particular set. The counter 280 therefore represents the number of fills that have taken place in the set (since the counter last overflowed). If the set counter 280 is at its predetermined value, then at step 630, the line counter 260 for the current entry is decremented, and the set counter 280 is reset (or allowed to overflow). Then, at step 635 it is determined whether the line counter 260 is at the predetermined value. Effectively, the line counter 260 indicates the number of times that the set counter 280 has reached its predetermined value. The line counter 260 is therefore used in combination with the set counter 280 to estimate the number of set fills that have taken place since the line was added. If the line counter 260 is at its predetermined value at step 635, then the process proceeds to step 620 where the line is set as being evictable. A line is therefore set as being evictable as a consequence as a number of fill operations having taken place since the line was added to the cache circuitry 210. If the line counter 260 is not at its predetermined value, then the process proceeds to step 640, which is also the case if the set counter 280 is not at its predetermined value at step 625.

If at step 640 it is determined that the tag of the cache line in question was considered to be a trigger that could not be added to the training queue 310 (as illustrated in FIGS. 4A and 4B) then the process proceeds to step 620 where the line is marked as evictable. This effectively acts as a penalty against existing trace lines that relate to data that is far down a linked list when data earlier in the linked list is not stored in a trace line. In particular, in future iterations, if the addition of new cache lines means that the existing cache line cannot continue to be added (e.g. if the training queue 310 becomes full when the trigger is encountered in the future), then this represents a situation in which the trigger is likely to be a long way down the linked list. Since values that are further down the linked list may be considered to be of less value then those up the linked list owing to the fact that a linked list may not be traversed in full, trace lines storing such data are demoted and moved closer to eviction. Otherwise, the process proceeds to step 655.

At step 655, it is determined whether a double hit occurs, this is a situation in which two cache lines are hit on by the same trigger—one a trace line 220 and one a data line 230. In this situation, it is assumed that the trace line 220 has become invalid, and so is directly set as evictable at step 620. If there was no double hit, then the process proceeds to step 605 where the next line is obtained.

In this example, both the set counter 280 and the line counter 260 are used to measure the number of fills that occur before determining whether a particular trace line 220 is considered to be evictable or not. The combination of counters 260, 280 recognises the fact that if only a single counter was provided, then that counter may be close to its predetermined value at the time a line was added. A trace line could then be added and deleted almost immediately. Conversely, if a large counter was added for each cache line, then this would result in a large amount of wasted space. Furthermore, the fill operation would be time consuming since every time a fill occurred within a set, all the counters in that set would need to be updated. The combination of counters 260, 280 therefore makes it possible to inhibit the removal of a cache line until a minimum number of fill operations has occurred, without necessitating a large amount of storage or a time-consuming update process.

Figure 7:
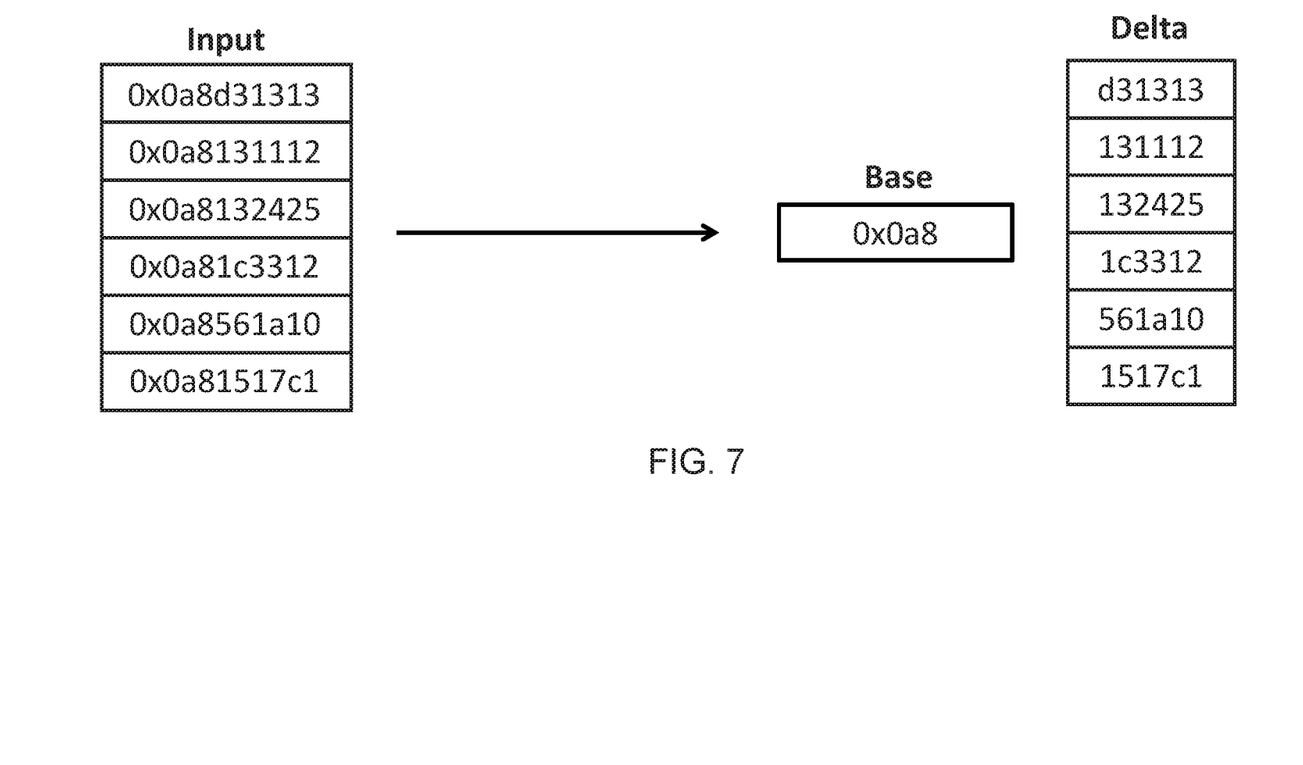
FIG. 7 shows an example of compression of addresses in accordance with some embodiments.

FIG. 7 illustrates an example of how compression can be used in order to compress the correlated addresses within a trace line. In this example, a number of input addresses are provided. Each of the input addresses contains a number of prefixed common bits. In this example, the common bits are '0x0aa8'. Consequently, by extracting these bits and by expressing them as a base address, it is possible to express the remaining addresses as a series of delta values. In this example, decompression can take place by simply concatenating the base address with each of the deltas.

In other embodiments, the delta could be derived from a target address by performing a subtraction between the base address and the target address. Decompression could then take place by performing an addition of the delta to the base address. Other techniques will be known to the skilled person.

In some embodiments, each cache line could specify the degree of compression provided. In particular, a number of different compression levels could be provided that indicate the number of bits that make up the base address. For instance, level one compression could correspond to two bits being used to make up the base address. Level two compression could be used to indicate four bits being used to the base address, level three with six bits and level four with eight bits. The compression level would be set to the highest that is possible for a set of correlated addresses. For instance, if all the correlated addresses only had six common prefixed bits, then the compression level would be set to three (six bits). Similarly, if all of the input addresses had seven bits in common, then a compression level of four would not be appropriate since this would include non-common-bits in the base address. The level would therefore be set to three. In this way, each trace line can use a different level of compression, as appropriate. This allows for maximum compression in some cases, while also allowing addresses that are highly dissimilar (or far removed from each other) to form part of the same correlation and thereby be stored in the same trace line.

Figure 8:
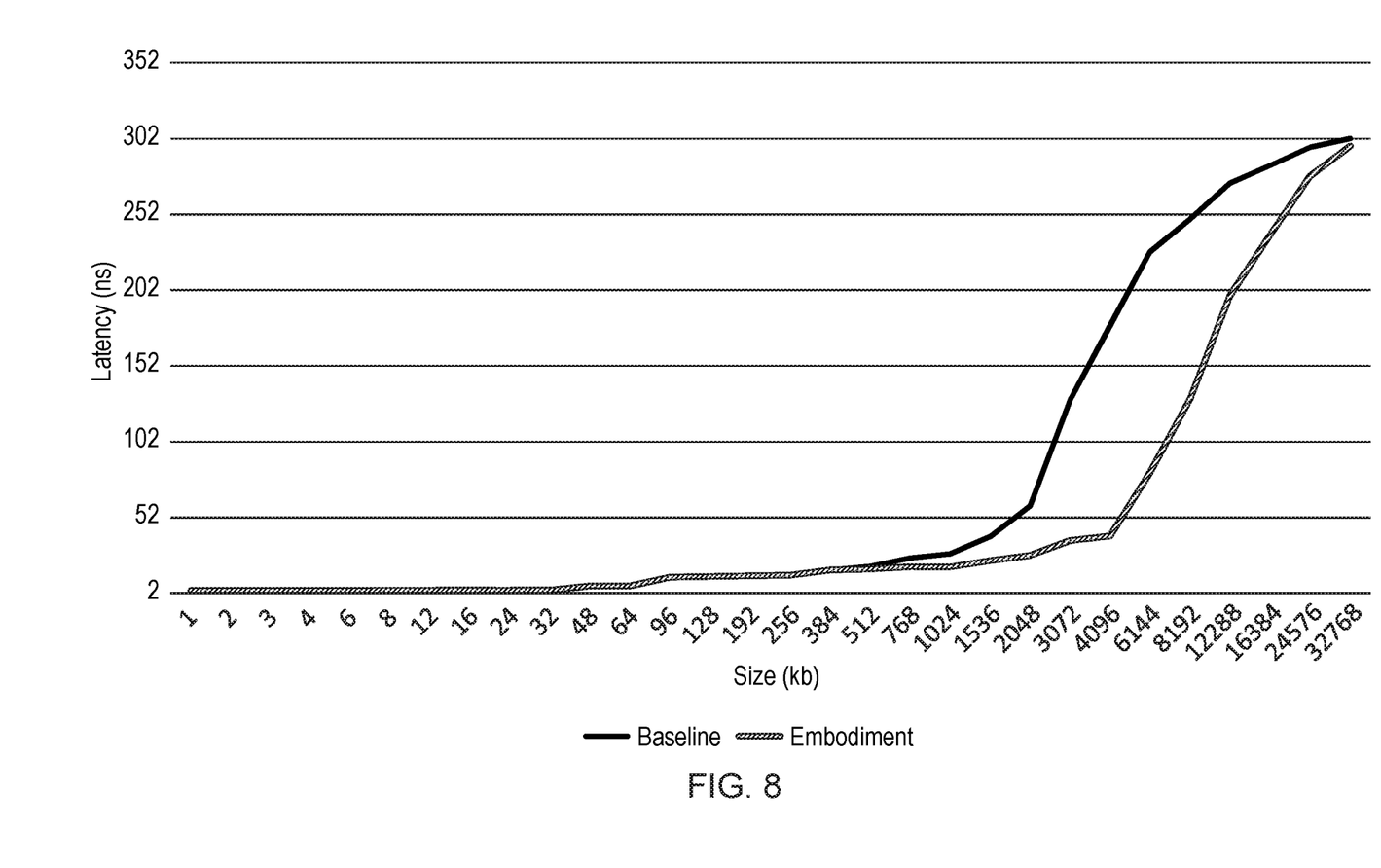
FIG. 8 shows an example analysis of the present technique.

FIG. 8 shows a graph and illustrates an example analysis of the present technique and particularly the latency of a cache for different cache sizes. In particular, the graph shows that up until a cache size of around 384 kB, the latency of the present technique approximately mirrors the latency of previously proposed embodiments. However, whereas in previous techniques, an increase in cache size beyond 384 kB has caused a sharp increase in latency, the present technique continues to provide a lower latency. In particular, the present technique provides a latency of 39 ns even with a cache size of 4096 kB. This is compared to previously proposed techniques that experience a latency of 179 ns in similar situations.

Clearly it will be appreciated by the skilled person that the improvement provided is highly dependent on the underlying architecture and the task that is being executed. Some systems may provide improvements even beyond those illustrated with respect to FIG. 8, while other architectures may derive little or no benefit.

Figure 9:
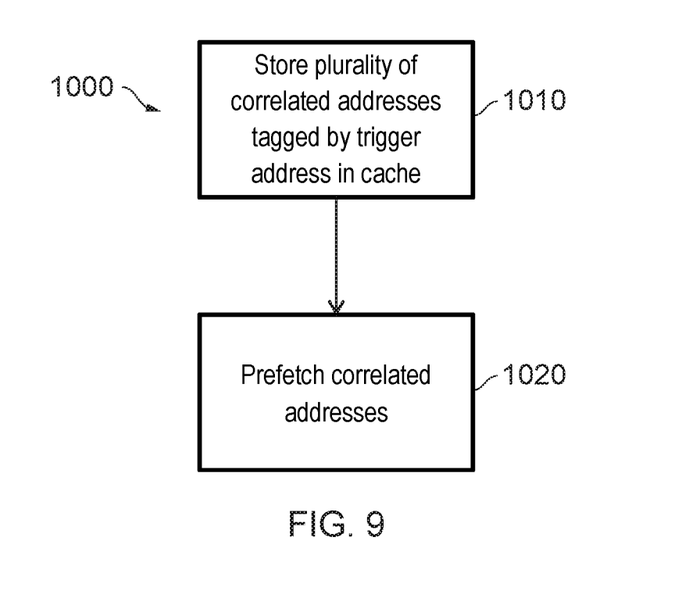
FIG. 9 shows a method in accordance with some examples.

FIG. 9 illustrates an example of a method in accordance with some embodiments. The method is illustrated in the form of a flow chart 1000. The process starts at a step 1010 in which a plurality of correlated addresses that are tagged by trigger addresses are stored in the cache. This may take the form of a trace line 220 as previously described. Then, at step 1020 the correlated addresses are prefetched.

As a result of the above, it can be shown that the technique of determining the number of correlated addresses that are not otherwise fetched by prefetching circuitry can be used in situations such as linked lists where a number of correlated addresses must each be fetched from memory, leading to a long memory latency for the underlying data value to be accessed. This is undesirable since it can lead to a number of high inefficiencies. Consequently, by storing these correlated addresses in repurposed cache lines as trace lines 220 it is possible for those lines to be prefetched in the future thereby reducing the extent to which memory latency occurs.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
cache circuitry comprising a plurality of cache lines each configured to store data, wherein the cache circuitry is configured to treat one or more of the cache lines as trace lines, wherein each trace line in the trace lines is tagged by a trigger address and comprises one or more correlated addresses as the data of the trace line that are correlated to and different to the trigger address; and
prefetch circuitry configured to cause data at the correlated addresses stored in the trace lines to be prefetched,
wherein each line in the plurality of cache lines comprises at least one flag to indicate whether that line is one of the trace lines,
wherein the at least one flag includes a c flag and a d flag to indicate whether that line is one of the trace lines and the c flag and the d flag are mutually-exclusive,
the apparatus further comprising eviction circuitry to evict the plurality of cache lines from the cache circuitry in dependence on one or more standard eviction conditions,
wherein the eviction circuitry is configured to inhibit evicting the trace lines in dependence on one or more correlated-address eviction conditions.

2. An apparatus according to claim 1, wherein
the prefetch circuitry is configured to cause the data at the correlated addresses to be prefetched in response to the trigger address being accessed.

3. An apparatus according to claim 1, comprising:
obtaining circuitry configured to obtain the correlated addresses, wherein
the correlated addresses relate to data where a miss has occurred.

4. An apparatus according to claim 1, wherein
the correlated addresses relate to data that has been explicitly fetched.

5. An apparatus according to claim 1, wherein
the correlated addresses relate to data that has been fetched as part of a load operation.

6. An apparatus according to claim 1, wherein
the correlated addresses contain at least one storage location where another of the correlated addresses is stored.

7. An apparatus according to claim 1, wherein
the trigger address and the correlated addresses form a linked list.

8. An apparatus according to claim 1, wherein
the correlated addresses in each of the trace lines are compressed.

9. An apparatus according to claim 8, wherein
the correlated addresses in a given trace line are compressed by storing a base address and, for each individual address in the correlated addresses of the given trace line, a delta between the base address and the individual address.

10. An apparatus according to claim 9, wherein
the base address comprises common bits between the plurality of correlated addresses in the given trace line; and
the delta comprises remaining bits from the individual address when the common bits are removed.

11. An apparatus according to claim 1, wherein
the one or more correlated-address eviction conditions includes a fill condition;
the plurality of cache lines are grouped into a plurality of sets;
each set in the plurality of sets has a set counter, which is incremented in response to a fill being made to that set; and
the fill condition causes a given trace line in the set to be made evictable based on the set counter associated with the given trace line.

12. An apparatus according to claim 11, wherein
the given trace line in the set is associated with a line counter;
the line counter is incremented each time the set counter of the given line reaches a predetermined value; and
the fill condition causes the given line to be made evictable when the line counter reaches a further predetermined value.

13. An apparatus according to claim 12, comprising:
trigger queue circuitry to store a plurality of triggering addresses, wherein
in response to the trigger address of the given line missing when the trigger queue circuitry is at its maximum capacity, the line counter associated with the given line is incremented.

14. An apparatus according to claim 12, wherein
the one or more correlated-address eviction conditions includes a double-hit condition;
the double-hit condition causes a given trace line to be made evictable in response to the cache circuitry hitting, in response to a request, on both the given cache line and a further cache line that is other than one of the trace lines; and
the given cache line and the further cache line have a same tag.

15. An apparatus according to claim 14, wherein
in response to adding a new trace line when the cache contains the further cache line that is other than one of the trace lines, the further cache line is marked as being evictable.

16. An apparatus according to claim 1, wherein
the cache circuitry is configured to limit a number of the trace lines to a predetermined level.

17. A method comprising:
storing a plurality of cache lines each storing data, the cache lines including one or more trace lines tagged by a trigger address and each comprising correlated addresses as the data of the trace line that are correlated to and different to the trigger address;
causing data at the correlated addresses stored in the trace lines to be prefetched,
wherein each line in the plurality of cache lines comprises at least one flag to indicate whether that line is one of the trace lines,
wherein the at least one flag includes a c flag and a d flag to indicate whether that line is one of the trace lines and the c flag and the d flag are mutually-exclusive, the method further comprising:
evicting the plurality of cache lines from the cache circuitry in dependence on one or more standard eviction conditions; and
inhibiting eviction of the trace lines in dependence on one or more correlated-address eviction conditions.

18. An apparatus comprising:
means for storing a plurality of cache lines each configured to store data, the cache lines including one or more trace lines tagged by a trigger address and each comprising correlated addresses as the data of the trace line that are correlated to and different to the trigger address; and
means for causing data at the correlated addresses stored in the trace lines to be prefetched,
wherein each line in the plurality of cache lines comprises at least one flag to indicate whether that line is one of the trace lines,
wherein the at least one flag includes a c flag and a d flag to indicate whether that line is one of the trace lines and the c flag and the d flag are mutually-exclusive,
the apparatus further comprising means for evicting the plurality of cache lines from the cache circuitry in dependence on one or more standard eviction conditions,
wherein the means for evicting is configured to inhibit evicting the trace lines in dependence on one or more correlated-address eviction conditions.

* * * * *